United States Patent [19]
Johnson

[11] 3,892,283
[45] July 1, 1975

[54] HYDRAULIC DRIVE

[75] Inventor: John W. Johnson, Manhattan Beach, Calif.

[73] Assignee: Advanced Power Systems, Los Angeles, Calif.

[22] Filed: Feb. 19, 1974

[21] Appl. No.: 443,220

[52] U.S. Cl. .................. 180/66 R; 60/413; 60/448
[51] Int. Cl. ........................................... B60k 17/10
[58] Field of Search ........... 180/66 R, 65 R; 60/413, 60/418, 477, 448, 444

[56] References Cited
UNITED STATES PATENTS

| | | | |
|---|---|---|---|
| 3,171,505 | 3/1965 | Imelmann | 180/65 |
| 3,188,810 | 6/1965 | Kuze | 60/444 |
| 3,238,724 | 3/1966 | Miller | 60/444 |
| 3,613,367 | 10/1971 | Smith et al. | 60/448 |
| 3,656,299 | 4/1972 | Fleury | 60/477 |
| 3,700,060 | 10/1972 | Keene et al. | 180/66 R |

Primary Examiner—David Schonberg
Assistant Examiner—David M. Mitchell
Attorney, Agent, or Firm—Lindenberg, Freilich, Wasserman, Rosen & Fernandez

[57] ABSTRACT

A hydraulic vehicle drive system that provides good acceleration using a small engine and pump, and which further increases fuel economy and available power by storing energy given up in braking the vehicle. The engine drives a pump that pumps some hydraulic fluid into a motor coupled to the rear wheels and pumps excess fluid into an accumulator for later use. The motor can be altered to operate as a pump during braking so that it brakes the vehicle by pumping fluid into the accumulator.

6 Claims, 4 Drawing Figures

HYDRAULIC DRIVE

BACKGROUND OF THE INVENTION

This invention relates to hydraulic vehicle drives.

Vehicles utilized in city driving or other situations where the vehicle must often accelerate and decelerate, could operate more efficiently if provisions were made to store the braking energy and release it during subsequent accelerations. A variety of energy-storing devices have been proposed, but such devices can add considerable complication to the vehicle drive system. A vehicle drive system which could store braking energy without requiring additional expensive components or complicated switching systems would enable low-cost and efficient vehicles to be constructed.

SUMMARY OF THE INVENTION

In accordance with one embodiment of the present invention, a simple and efficient hydraulically driven vehicle is provided which is driven and partially braked by a converter which is alternately operated as a motor and pump, the vehicle storing the braking energy for later use in accelerating. The hydraulic drive includes a pump driven by an engine to pump some fluid to the converter to drive the vehicle and to pump excess fluid into an accumulator for later use in accelerating. The converter is of the type that includes pistons reciprocated by a swash plate, in which the swash plate can be pivoted to vary the displacement down to zero and in which the swash plate can be pivoted past the zero displacement position to cause fluid flow in the opposite direction, thereby enabling the converter to be operated as either a motor or pump. The vehicle has an accelerator pedal which varies the swash plate angle in a direction to operate the converter as a motor. The vehicle also has a brake pedal which varies the swash plate angle in a direction to operate the converter as a pump. The vehicle can employ a small engine and small pump and yet can provide good acceleration which previously has normally required the use of a large engine.

The brake pedal is coupled to the swash plate by a mechanism which rapidly reduces the displacement of the converter as the speed of the vehicle drops below a predetermined low level such as 5 mph. This helps prevent locking of the wheels as the regular brakes are applied, to help prevent skidding.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
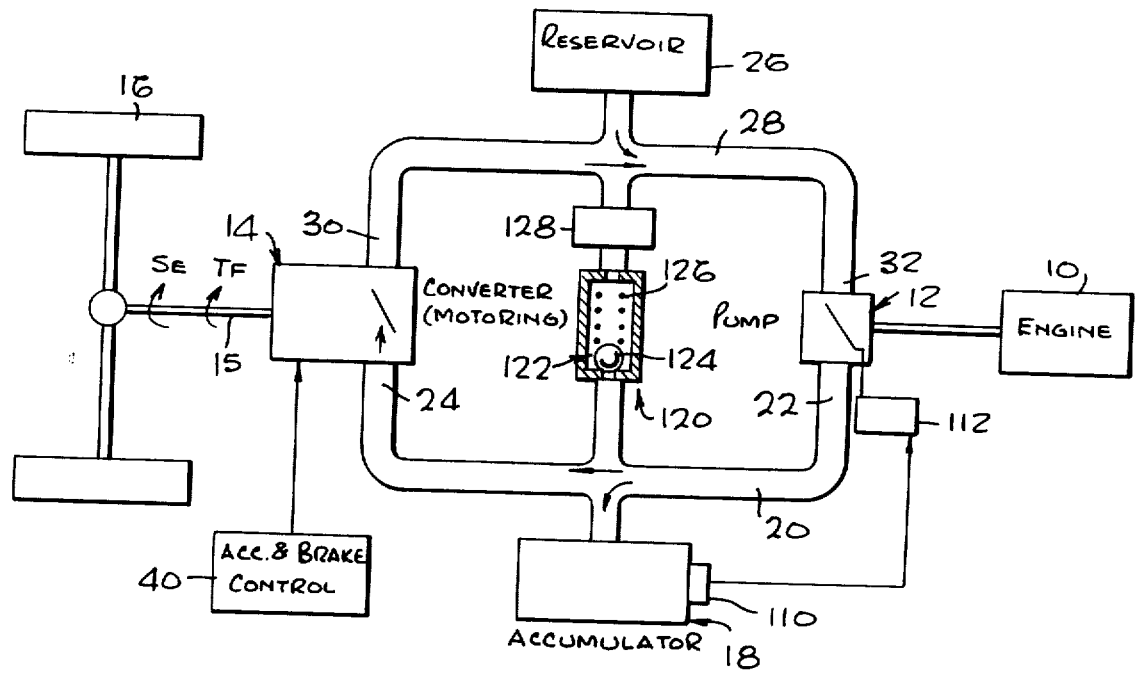
FIG. 1 is a simplified diagrammatic view of a vehicle constructed in accordance with the invention, in a condition where the vehicle is running at a constant speed.

FIG. 1 illustrates a hydraulic drive which includes an engine 10 that drives a hydraulic pump 12. Fluid from the pump 12 normally drives a hydraulic motor or converter 14 that is connected through an output shaft 15 to the rear wheels 16 of the vehicle to propel the vehicle along the ground. The hydraulic drive also includes an accumulator 18 connected to the conduit 20 that connects the outlet 22 of the pump to a first port 24 of the converter. A reservoir 26 is also provided which is connected to a conduit 28 that couples a second port 30 of the converter to the inlet 32 of the pump. During constant speed running of the vehicle, some of the fluid pumped by the pump 12 is delivered to the converter 14 to drive the vehicle, while additional fluid from the pump may enter the accumulator 18. The accumulator may be of the type which includes a chamber partially filled with air or other gas, so that as fluid is pumped into it, the gas is compressed. When the vehicle must accelerate and the demand by the motor for pressured hydraulic fluid exceeds that which can be delivered by the pump 12, such additional fluid is obtained from the accumulator 18.

Figure 2:
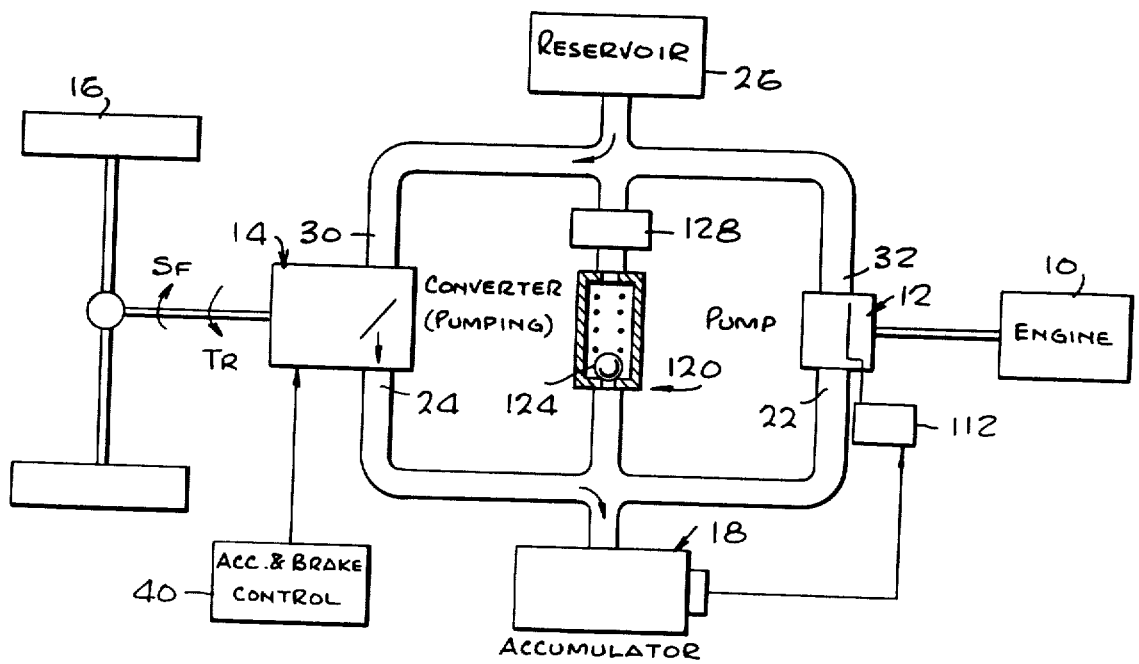
FIG. 2 is a view similar to FIG. 1, but with the vehicle dynamically braking.

The hydraulic drive is designed to utilize energy available in braking the vehicle, to pump additional fluid into the accumulator 18 so as to increase the efficiency of the system with respect to fuel consumption, and also to provide additional power for acceleration. FIG. 2 illustrates the system during dynamic braking. In this condition, the converter 14 is operated as a pump which receives energy from the rear wheels 16 and which pumps fluid from the second port 30 of the converter to the first port 24 thereof and into the accumulator 18. During dynamic braking of a forward-moving vehicle, the converter delivers torque in a reverse direction, as indicated by arrow $T_R$, which is opposite the forward direction of output shaft rotation, as indicated by arrow $S_F$.

The drive system is designed to undergo a smooth transition between the driving mode, wherein the converter 14 is operated as a motor, and a braking mode wherein the converter is operated as a pump, without the need for complicated valving arrangements. This is accomplished by the use of an accelerator and brake control system 40 which is shown in greater detail in FIG. 3. The converter 14 is of the well-known plunger type that includes cylinders 42 in a rotating barrel 43, the cylinders being connected to the first and second ports 24, 30 of the converter. The cylinders hold pistons 44 which are connected to a tiltable keeper plate 45. The keeper plate 45 and barrel 43 are rotated by a drive shaft 50 which is connected to the rear wheels of the vehicle. A non-rotating cam or swash plate 46 bears (through roller bearings) against the keeper plate 45 to tilt the keeper plate back and forth at every revolution of the drive shaft 50, to thereby reciprocate the piston 44. The length of stroke of the pistons is determined by the angle A of the swash plate from a neutral position indicated by the imaginary line 51. When the angle A is zero, the pistons 44 are not reciprocated and the displacement of the converter is zero. When the swash plate is in the position shown in FIG. 3, the hydraulic fluid flows from the first port 24 to the second port 30 so that the converter acts as a motor to deliver torque in the same direction as the direction of rotation. However, when the swash plate 46 is pivoted past the center position to a position such as that indicated at 46a, the fluid flow is in the reverse direction, and the converter can act as a pump fluid from the second port 30 to the first port 24. Pivoting of the swash plate 46 is controlled by axial movement of a control input in the form of a rod 56. This type of variable displacement converter is well-known in the art and therefore the converter has not been described in detail.

Axial movement of the control rod 56 is controlled by a control piston 60 which moves within a control cylinder 62. A pair of springs 64, 66 bear against opposite sides of the piston 60 to urge it towards a center position. Also, pressured hydraulic fluid is supplied from a source 68 and through two orifices 70, 72 to either side 74, 76 of the cylinder to urge the piston in either direction, although the hydraulic forces on both sides may cancel one another to leave the piston at its central position. The piston is moved when fluid flows through either of two valves 78, 80 from either side of the cylinder into the reservoir 26, to lower the pressure on one side of the cylinder. By controlling valves 78, 80, the control apparatus determines the position of the pistons 60 and therefore the pivot angle of the swash plate 46, so that the displacement and direction of hydraulic fluid movement through the converter is controlled.

The vehicle includes an accelerator pedal 82, which may be of the conventional type used in automobiles or which may be in any other form desired. The pedal 82 is connected to a potentiometer 84 which controls the flow of current from an electric cell 86 through a valve winding 88 of the valve 80. The valve 80 is of a type which is variably controlled by the amount of current flowing through the winding 88 thereof, the greater the current the greater the degree of opening of the valve. When a driver depresses the pedal 82, the resistance of the potentiometer 84 decreases so that more current flows through the valve winding 88 to increase the valve opening. This decreases the pressure at the side 76 of the hydraulic cylinder to cause the piston 60 to move to the right, as viewed in FIG. 3. As the piston 60 moves to the right, the swash plate angle A increases, thereby increasing the displacement of the converter while it operates as a motor. When the accelerator pedal 82 is released, the piston 60 returns to its central position and the swash plate 46 moves to, or close to, a neutral position as indicated by the line 50, wherein the pump has nearly zero displacement.

Figure 3:
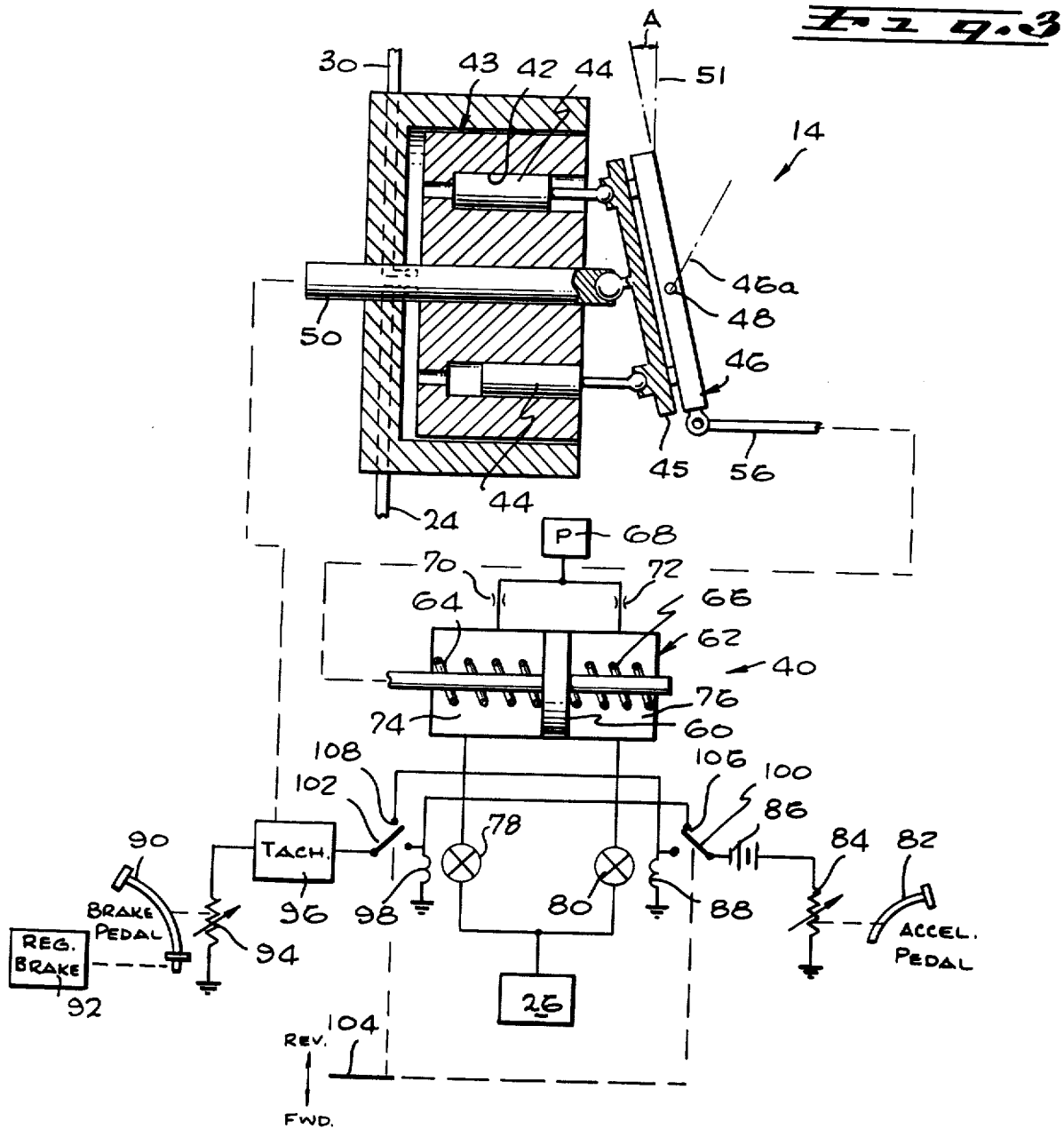
FIG. 3 is a diagrammatic view of the acceleration and brake control of the vehicle of FIG. 1.

Braking of the vehicle is controlled by depression of a brake pedal 90 which controls the converter 14 and which also operates a regular brake 92. The regular brake 92, which may be a drum or disc brake, is operated only during a last portion of brake pedal depression, while dynamic braking through the converter 14 is controlled prior to operation of the regular brake. The brake pedal 90 moves the wiper of a potentiometer 94 which is coupled through a tachometer 96 to windings 98 that control the opening of the braking valve 78. The tachometer 96 generates a current, while the potentiometer 94 controls the amount of that current which flows through the windings 98 and therefore controls the degree of opening of the valve 78. As the valve 78 opens, fluid is drained from the side 74 of the control cylinder 62. This causes the piston 60 to move to the left, as seen in FIG. 3, which causes the swash plate 46 to pivot. As the piston 60 moves left of its central position, the swash plate 46 pivots towards the position 46a, and therefore the converter 14 can operate to pump fluid towards the accumulator to brake the vehicle.

Figure 4:
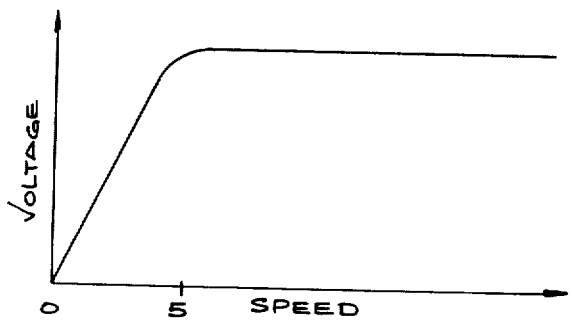
FIG. 4 is a graph showing the variation in braking characteristics with speed of the vehicle.

The tachometer 96 is coupled to the rear wheels 16 of the vehicle, as through the converter shaft 50, so that the tachometer output depends upon the speed of the vehicle. However, the tachometer voltage-speed relationship has a characteristic shown in FIG. 4. That is, the voltage output of the tachometer increases with the speed of the rear wheels until a predetermined speed, such as 5 mph, is reached, after which the tachometer output remains substantially constant with speed. This can be accomplished, for example, by connecting a zener diode across an ordinary tachometer output to limit the voltage. The decrease of tachometer voltage as the vehicle speed decreases, results in the gradual inoperation of dynamic braking as te vehicle approaches zero speed. This is useful to prevent the vehicle from beginning to move in reverse when the dynamic brake is applied, and is also useful to prevent locking of the wheels.

If a driver greatly depresses the brake pedal 90, he causes both the dynamic brake to be applied to the full extent, and also causes engagement of the regular brake. The addition of dynamic braking to regular braking is useful in the same manner as power-assisted braking. However, the addition of dynamic braking to the regular braking can readily cause the rear wheels of the vehicle to become locked (in a rear-wheel drive vehicle). However, the fact that the dynamic braking becomes inoperative as the wheels approach a locked condition means that locking of the wheels is less likely to occur. Thus, the use of a tachometer to control the degree of effectiveness of the dynamic braking allows the system to act to some degree as an anti-skid device. It also may be noted that the addition of dynamic braking to only the rear wheels of a vehicle helps to increase the stability of the vehicle during braking, because the greater braking force applied to the rear wheels helps to prevent swerving.

The vehicle can be driven in reverse without the operation of hydraulic valves, by merely operating a pair of switches 100, 102, that respectively couple the electric cell 86 and tachometer 96 to the valves 80 and 78. When a reversing lever 104 is operated to move the switches 100, 102 into contact with switch terminals 106, 108, respectively, depression of the accelerator pedal 82 moves the vehicle in reverse while depression of the brake pedal 90 slows the vehicle, with operation occurring in the same manner as for forward vehicle movement.

After the vehicle has been running for a while without accelerating, the accumulator 18 may become fully charged. The approach of full accumulator charging is sensed by a pressure sensor 110 which can be connected to the accumulator or anywhere along the first conduit 20 which couples the accumulator to the pump and converter. The pressure sensor is coupled to a pump control 112 which controls the operation of the pump 12 to reduce the output therefrom. The pump 12 is of a variable displacement type, such as the swash plate type used for the converter, and the pump control 112 reduces the pump displacement to nearly zero as the accumulator pressure indicates that the accumulator is becoming fully charged.

If the accumulator 18 is fully charged at a time when dynamic braking is employed, then the oil pumped by the converter 14 cannot flow into the accumulator. Instead, a pressure reliever 120 is provided which allows for the flow of fluid from the first port 24 of the converter towards the reservoir 26. The pressure reliever 120 includes a valve 122 having a ball 124 pressed by a spring 126 against a valve seat. The spring 126 allows the valve to open when a predetermined high pressure is reached, the pressure being that at which the accumulator becomes fully charged. As hydraulic fluid flows through the valve 122, considerable heat may be generated. Such heat may be dissipated, if required, by inclusion of a heat exchanger 128 in the flow path from the relief valve.

Prior to starting the engine 10, there may be oil already under pressure in the accumulator. Such oil may be present from a previous operation of the vehicle or may be pumped therein by an auxiliary pump. If a swash plate pump 12 is utilized, then the pressure in the accumulator can even be used to start the engine 10 by moving the swash plate overcenter for starting. In any case, once the engine is started, the pump control 112 controls the pump displacement to pump hydraulic fluid into the accumulator 18. The vehicle can be accelerated at any time just by increasing the displacement of the converter 14. During constant speed running of the vehicle at a low or moderate speed, the pump can deliver more hydraulic fluid than is required by the converter to maintain the vehicle speed, and therefore the accumulator is gradually charged. As the accumulator becomes fully charged, the displacement of the pump 12 decreases, so that the load on the engine is relatively low and the fuel consumption is low. After a long period of driving at constant speed, a steady-state condition will be reached wherein the amount of hydraulic fluid pumped by the pump 12 equals the amount of fluid passing through the converter 14. If the driver releases the accelerator but does not depress the brake pedal, then the vehicle will freewheel, with the converter 14 having zero displacement. During free-wheeling, the pump 12 may continue to pump oil to the accumulator.

When the driver depresses the brake pedal only a moderate amount after the accumulator is nearly fully charged, the converter pumps oil into the accumulator while the pump 12 operates at zero displacement. The pump control 112 is normally set so that the pump is operated at zero displacement prior to the accumulator becoming fully charged, so that dynamic braking usually results in the pumping of oil into the accumulator rather than flow through the pressure-relieving valve 122.

Thus, the invention provides a hydraulic drive which is especially useful in vehicles which often undergo acceleration and braking, to provide high efficiency of vehicle operation in a hydraulic drive of relative simplicity. This is accomplished by utilizing a converter coupled to an engine-driven pump and to the wheels of the vehicle, wherein the converter can be operated as both a motor and pump, and by employing an accumulator to store energy from the pump as well as braking energy from the converter. The dynamic braking supplements a regular braking system such as a drum or disc brake, but with the dynamic brake becoming inoperative as the vehicle's wheel speed approaches zero so that the dynamic brake helps to prevent skidding of the wheels. The hydraulic drive system can be utilized in a wide variety of vehicles, including even track driven vehicles where the drive wheels turn the tracks.

Although particular embodiments of the invention have been described and illustrated herein, it is recognized that modifications and equivalents may readily occur to those skilled in the art, consequently, it is intended that the claims be interpreted to cover such modifications and equivalents.

What is claimed is:

1. In a vehicle which includes an output shaft coupled to at least one wheel for propelling the vehicle, and a brake pedal means which is operated when it is desired to slow the vehicle, the improvement comprising:
    an engine;
    a hydraulic pump coupled to the engine to be driven by it;
    a hydraulic converter coupled to the output shaft, said converter having first and second ports;
    an accumulator for storing and releasing hydraulic fluid under pressure, said accumulator coupled to the outlet of said pump and the first port of said converter;
    a hydraulic fluid reservoir coupled to the inlet of said pump and the second port of said converter;
    said hydraulic converter including means operable as a motor to drive the output shaft in a forward direction in response to the passage of hydraulic fluid from the first to the second port thereof, said means of said converter also being operable as a braking pump to pump fluid from the second to the first port thereof in response to torque from said output shaft as said output shaft turns in a forward direction; and
    operating means coupled to said brake pedal means for operating said means of said hydraulic converter as a braking pump, whereby to use braking energy from the output shaft to pump hydraulic fluid into the accumulator for future use without requiring an additional pump or complicated valve system.

2. A vehicle comprising:
    an engine having a shaft;
    a hydraulic pump connected to the shaft of the engine;
    a hydraulic converter having first and second ports, an output shaft, and a control input, said converter being of a type which can be varied in displacement per output shaft revolution and in the direction of fluid flow between said ports, by operation of said control input;
    wheel means coupled to the output shaft of said hydraulic converter;
    a first conduit coupling the outlet of the pump to said first port of said converter;
    a second conduit coupling the inlet of the pump to said second port of said converter;
    a hydraulic accumulator coupled to said first conduit;
    a hydraulic fluid reservoir coupled to said second conduit;
    an accelerator pedal which is variably depressable;
    means coupled to said accelerator pedal for operating said control input of said converter to increase the displacement of the converter in fluid flow from the first port to the second port as the depression of the accelerator pedal is increased during forward vehicle movement;
    a brake pedal which is variably depressable;
    a regular brake coupled to said brake pedal and said wheel means, for applying a progressively increasing retarding torque to the wheel means as the brake pedal depression is increased during a final portion of brake pedal depression; and
    an auxiliary brake means including a sensor for sensing brake pedal depression along a region of pedal depression which includes positions prior to said final portion of brake pedal depression, and brake operating means responsive to said sensor for operating said control input of said converter to flow fluid from the second port to the first port during forward vehicle movement.

3. The vehicle described in claim 2 wherein said operating means of said auxiliary brake means includes a tachometer for sensing the speed of said wheel means, and means for progressively decreasing the displacement of said hydraulic converter as the speed of the wheel means progressively decreases below a predetermined speed.

4. In a vehicle which includes an output shaft coupled to at least one wheel for propelling the vehicle, and a brake pedal means which is operated when it is desired to slow the vehicle, the improvement comprising:

an engine;

a hydraulic pump coupled to the engine to be driven by it;

a hydraulic converter coupled to the output shaft, said converter having first and second ports;

an accumulator for storing and releasing hydraulic fluid under pressure, said accumulator coupled to the outlet of said pump and the first port of said converter;

a hydraulic fluid reservoir coupled to the inlet of said pump and the second port of said converter;

said hydraulic converter including selectively operable means for generating an output torque in response to the passage of hydraulic fluid from the first to the second port thereof to drive the output shaft in a forward direction, and for pumping fluid from the second to the first port thereof in response to torque from the output shaft to brake the vehicle as it moves in a forward direction;

operating means coupled to said brake pedal means for operating said operale means of said hydraulic converter to pump fluid to brake vehicle;

tachometer means for sensing the speed of said output shaft; and means coupled to said tachometer means and said operating means for substantially terminating the operation of said converter to pump fluid to brake the vehicle, as the speed of the output shaft decreases below a predetermined low speed.

5. In a vehicle which includes an output shaft coupled to at least one wheel for propelling the vehicle, the improvement comprising:

an engine;

a hydraulic pump coupled to said engine to be driven by it;

selectively operable hydraulic converter means coupled to the output shaft for operation in a drive mode to convert the flow of hydraulic fluid in a first direction to torque that drives the output shaft, or for operation in a braking mode to convert torque in the output shaft into hydraulic pumping power to pump hydraulic fluid in an opposite second direction;

an accumulator for storing and releasing hydraulic fluid under pressure;

means coupling said accumulator to said hydraulic pump for carrying fluid from said pump to said accumulator, said means also coupling said accumulator to said converter for carrying fluid between said accumulator and said converter means;

accelerator means coupled to said converter means for operating said converter means in said drive mode; and braking means coupled to said converter means for operating said converter means in said braking mode to pump hydraulic fluid into said accumulator, whereby both excess engine energy and braking energy are stored in a simple manner for release in driving the vehicle.

6. The improvement in the vehicle described in claim 5 wherein:

said hydraulic converter means comprises a plunger mechanism that includes a rotatable barrel coupled to said output shaft and having a plurality of cylinders thereon coupled to said accumulator, a plurality of pistons slidable in said cylinders, and swash plate means engaged with said pistons to reciprocate said pistons in said cylinders as said barrel rotates;

said swash plate means being pivotable from a neutral position to prevent reciprocation of said pistons, to a first position wherein said plate means reciprocates said pistons to move hydraulic fluid from said first port to said second port during forward output shaft rotation, and to a second position wherein said plate means reciprocates said pistons to move hydraulic fluid from said second port to said first port during forward output shaft rotation; and said acceleration means and said braking means are coupled to said swash plate means to respectively pivot said swash plate means to said first and second positions.

* * * * *